May 14, 1968   J. V. FITZGERALD ET AL   3,382,706
OSCILLATORY ELEMENT FOR MEASURING VISCOSITY
Filed Oct. 12, 1965

INVENTORS.
John V. Fitzgerald
Frank J. Matusik

United States Patent Office 3,382,706
Patented May 14, 1968

3,382,706
OSCILLATORY ELEMENT FOR MEASURING
VISCOSITY
John V. Fitzgerald, Metuchen, and Frank J. Matusik,
Piscataway Township, N.J., assignors to National Metal
Refining Company, Inc., Highland Park, N.J., a corporation of New Jersey
Filed Oct. 12, 1965, Ser. No. 495,231
1 Claim. (Cl. 73—59)

ABSTRACT OF THE DISCLOSURE

This device measures viscosity of fluids and consistency of fluid-like materials by the oscillatory method. Both driver and detector are supported by a rigid central shaft which is attached to the free end of an elastic protective sheath. Also attached to the free end of the sheath is a vibrating tip which senses viscosity or consistency when part of the tip's surface contacts a fluid or a fluid-like material.

---

This invention relates to viscosity and consistency meters, and more particularly to an oscillatory type of element for use in measuring the viscosity of liquids and the consistency of mastics and heavy creams. Measurements of liquid viscosity are of great importance in many industries in research and development, quality control of product, and process control. The same is true for measurements of consistency.

Several types of meters for measuring fluid viscosities have been developed and some of these are commercially available. All of these meters have certain characteristics disadvantages and limitations. Some lack ruggedness, and must be mounted for industrial use in special alignments and in specially chosen locations; they also require the use of guards. Others are not suitable at all for industrial use. Some, of the vibrating-reed type, measure at one frequency only, or at best at only a few frequencies rather than through a broad spectrum of frequencies; this limitation curtails their usefulness. Others canot be operated in corrosive liquids or in difficult environments.

It is the object of the present invention, which constitutes the mechanically active portion of a viscosity meter of the vibrating type, to provide a device which is free from the limitations previously mentioned, and which is capable of operating on a continuous basis in an industrial environment, as well as in a laboratory. The present invention is ruggedly constructed so that it needs no guard or specially favoring conditions when installed in an industrial location. Further, it operates conveniently through a wide spectrum of frequencies, which makes it especially invaluable for the investigation of non-Newtonian fluids—e.g., the measurement of the consistencies of thick oils and pastes. Further, it is adapted to measure the viscosity of corrosive as well as non-corrosive fluids. Further, its design makes possible the inclusion of a thermocouple to measure liquid temperatures accurately and conveniently.

In order that the invention may be understood more clearly, reference is made to the drawings in which.

Figure 5:
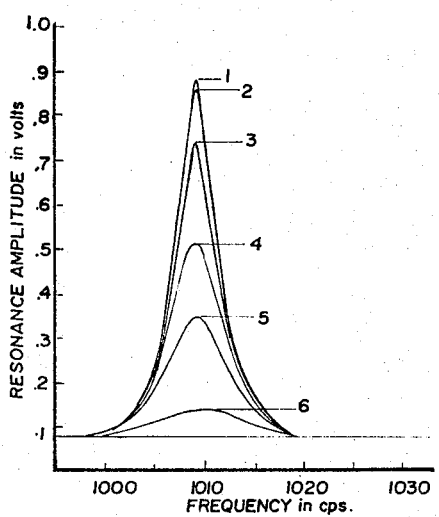

In FIGURE 5 are recorded resonance amplitudes for six different standard viscosity liquids.

Figure 6:
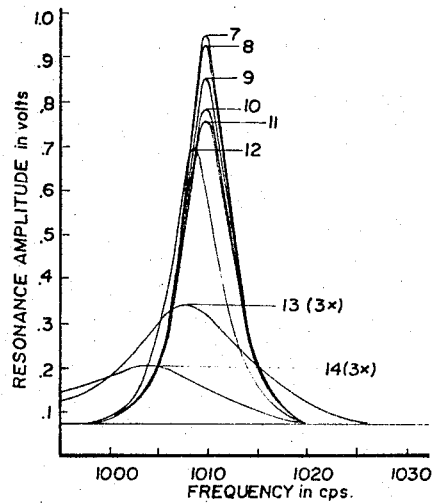

In FIGURE 6 are recorded resonance amplitudes obtained for eight different fluid materials.

Figure 1:
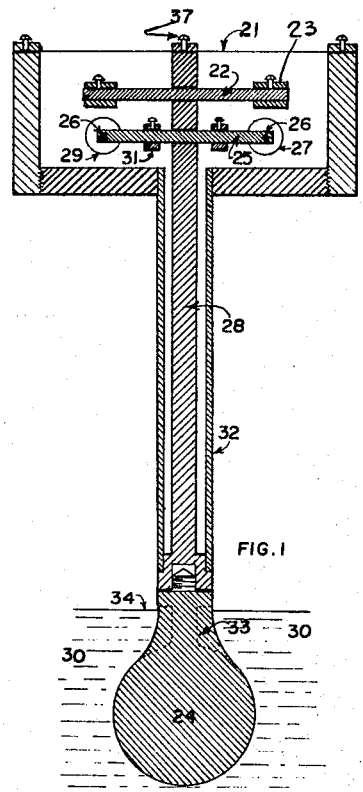
FIGURE 1 is a vertical sectional view taken axially through a preferred species of our oscillatory element with its tip shown immersed in a liquid.

A preferred embodiment of the present invention is an elongated solid element in resonant vibration, with its lower end or tip immersed in the fluid whose viscosity is to be measured. When an oscillatory element is immersed in a liquid, the amplitude of vibration at resonance decreases because of the viscous drag of the liquid. Viscous liquids, such as heavy oils, or materials of thick consistency, such as mastics, decrease or dampen the amplitude of the oscillations to such a low level that substantially more power is required to sustain oscillation than when the element is surrounded by a gas, such as air, or is immersed in a light liquid, such as gasoline. It can be shown that the degree of attenuation of the oscillations is directly related to the viscosity of the fluid when the oscillations produce shear at the interface between oscillating element and fluid. In the oscillating element of the present invention, which may be described as a cylinder in torsional vibration furnished with an immersed tip usually of approximately spherical configuration, the vibrations at the liquid-solid interface are predominantly shear oscillations. As shown by FIGURE 1, the element has a multifunctional cylindrical section which provides (1) the elastic torsional reaction to sustain vibrations, (2) hermetic protection of the inner shaft by means of an outer, cylindrical sheath, (3) mechanical strength against abuse, (4) structural support to the immersed tip, and (5) structural support for driving and detection in such a manner that these two operations are protected and are remote from the hot, cold, or corrosive liquids being measured.

In FIGURE 1, a cross-sectional view of the transducer, anchor wires 21 are shown at the top of the torsion element in order to keep the control bar properly centered and to resist bending when the tip is inadvertently bumped. The use of these wires is optional.

Directly below the anchor wires is shown an inertial bar 22 to which cylindrical weights 23 can readily be added, thereby reducing the frequency of vibration of the element. For the same purpose a disc may be added around the central shaft. A change of tip 24, to be described later in more detail, is a third means of changing frequency of vibration. A principal advantage of the present invention is the ease with which oscillation frequency can be changed by any or all of the three means just mentioned. This advantage is lacking when oscillations are provided by magnetostrictive or piezoelectric means.

The control bar 25, which is situated directly below the inertial bar in FIGURE 1, has magnets 26 at both ends, each of which is located within an electromagnetic coil. One of these is the driving coil 27; pulses of current sent through this coil cause the control bar and the torsional element 28 to which it is attached to vibrate. The extent or degree of this vibration is measured by the current produced in the detector coil 29. A comparison of the driving and detection coil currents informs as to the extent of vibrational damping of the torsion element by the liquid 30 in which its tip is immersed. This damping action is a measure of viscosity for Newtonian liquids subjected to shear.

The control bar, as shown by FIGURE 1, also supports small masses or frequency trimmers 31 for regulating the vibrational frequency of the torsion element to a precise degree.

The torsion element consists of a central shaft 28 enclosed by an outer, cylindrical sheath 32. This construction combines strength, rigidity, and lightness of weight which makes it possible to drive the element with no more than a reasonable expenditure of power.

The tip as shown is interchangeable. A small, dense tip is most suitable for measuring highly viscous liquids, since the smallness of the area of contact with liquid decreases the total damping effect. Conversely, a light tip with a large surface is most suitable for use with gases and with liquids of low viscosity. It is evident that the device can be threaded or welded through the walls of a pipe or tank and monitored at a remote location. Where desired, both torsion element and tip may be immersed in liquid.

It is possible to constrict the area where tip meets torsion cylinder, as shown in FIGURE 1. Such constriction 33 minimizes measurement error due to variations of liquid level 34.

Figure 2:
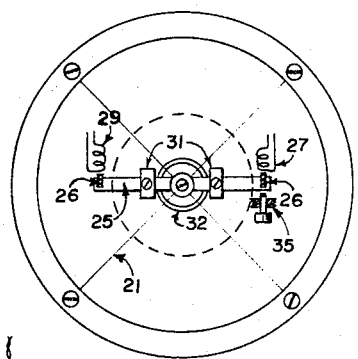
FIGURE 2 is a top view of this same element.

In FIGURE 2, a plan view, the inertial bar is omitted to aid clarity of presentation. Zero adjustment is easily obtained by applying a slight pre-torque to the torsion cylinder by means of the driving-coil magnet, and then accentuating or relieving this torque by means of the zero-adjustment magnet 35.

The oscillating torsion element shown in FIGURES 1 and 2 is a rugged, complete electromechanical transducer.

Figure 3:
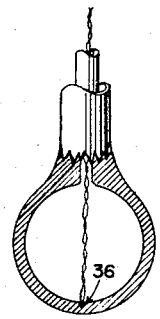
FIGURE 3 is a sectional view of an alternate hollow tip showing an enclosed thermocouple in intimate contact with the tip wall.

FIGURE 3, a cross-sectional view of a tip, illustrates a thermocouple 36 in contact with, or preferably embedded in, the wall of an interchangeable tip. Since in most instances the tips are constructed of metal, and metals are excellent thermal conductors, the thermocouple is ideally located to measure the temperature of the liquid subjected to vibration. It is very important to know this temperature accurately because the viscosity of many materials, such as polymers and glasses, is markedly affected by temperature. All other viscosity meters known to the inventors must use separate probes for the measurement of the temperature, which is disadvantageous from the standpoint of accuracy and in many other ways.

Figure 4:
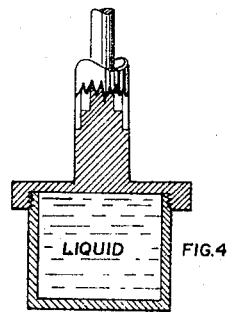
FIGURE 4 is a sectional view of an alternate hollow tip, which contains the liquid sample as contrasted with FIGURE 1 where the tip is immersed in the liquid sample.

In FIGURE 4, the liquid whose viscosity is to be measured is contained in a cup which serves also as the tip of the torsion element.

It is a feature of the present invention that only the torsional oscillations produced in the interchangeable tip by the outer cylindrical sheath are used to shear the liquid whose viscosity is to be measured. There is no a priori reason to expect the configuration shown in FIGURE 1 to be capable of outer-cylinder oscillations free from interference from the natural oscillations of the inner cylinder. However, experiments showed that such can be the case. This experimental accomplishment is a feature of the present invention. Subsequently it was shown that the experimental observations fitted a simple mathematical theory, which is presented herewith.

The resonance frequency $f$ for the oscillatory element is equal to $(k/I)^{1/2}/2\pi$. The spring constant $k$ is the torque required to twist the cylindrical section one radian, or $G\pi(r_1^4-r_2^4)/4l$, where $G$ is the modulus of rigidity, $r_1$ is the outer radius, $r_2$ is the inner radius, and $l$ is the length. $I$ is the moment of inertia of the vibrating parts.

Thus a spherical tip will contribute $(8/15)\pi a^5 d$ to the moment of inertia, where $a$ is the radius and $d$ is the density. An extra-ballast inertial bar loaded with cylindrical masses, which served to decrease the resonance frequency from 690 c.p.s. to 250 c.p.s. in a model of the present invention, contributed to the moment of inertia in accordance with the expression $$(\pi a^2 d/12)(3a^2 l_2 - 3a^2 l_1 + l_2^3 - l_1^3)$$

where $l_1$ is the distance between the near faces of the cylindrical masses and $l_2$ is the distance between their far faces.

To avoid interference, the frequency $f$ of the loaded cylinder should be different from the frequency $f_r$ of the inner support rod. Let $f_r$ be greater, $\sqrt{10}f$. Now $k$ for the cylinder may be expressed as $(0.05G/l)(D_1^4-D_2^4)$ and $10k_r$ for the rod as $(0.5G/l)D_3^4$. By letting $D_1$ equal 2 and $D_3$ equal 1, the inner diameter $D_2$ of the cylinder becomes 1.56 and the annular cavity gap width 0.28.

The foregoing computation was consistent with the experimental observations of an oscillatory torsion element. The assumption that the inertial loading is the same for both torsion cylinder and support is reasonable for establishing feasibility as well as practicality. In other words, the inertial contribution of the supporting post is small compared to the inertial contribution of the special inertial bar.

Clearly, the length of the cylindrical section is much less critical than its two diameters so far as the resonance frequency is concerned. Also, the axial hole, through which the thermocouple leads pass, can be made small enough to have little effect on the resonance frequency.

The resonance response in vacuum or air will be as sharp as the composition of the cylindrical section permits; also, the frequency will be proportional to the (rigidity modulus)$^{1/2}$. Sharpness of response is expressed as Q. Suitable typical materials for the cylindrical section are: alumina, vitreous silica, steel, glass, platinum, plastics, stainless steel, aluminum, or preferably a metal with a low coefficient of expansion and a low coefficient of change of torsional modulus with changing temperature.

In the model used to make the measurements which follow, the brass cylindrical section was 11 cm. long by ⅜ inch outer diameter by 11/32 inch inner diameter. Q was about 1000, and the shear modulus was about $3.5\times10^{11}$ dynes per square centimeter.

The resonance amplitude for a series of viscosity standards of commercial Brookfield-type silicone oils, as they were recorded by a commercial acoustic spectrometer using an oscillatory torsion element 20 cm. long are shown in FIGURE 5. A steel teardrop-shaped tip 3.2 cm. in diameter, such as the one shown in FIGURE 1, was used.

Tabulated below are apparent internal frictions ($Q^{-1}$'s) computed by the relation $Q^{-1}=(f_2-f_1)/f_n\sqrt{3}$, where $f_2-f_1$ is the band width at half amplitude and $f_r$ is the resonance frequency, which in this instance was about 1010 cycles per second. The amplitudes at resonance are also tabulated. All results pertain to the standard-viscosity silicone oils at 22 deg. C. excepting number one, which is for water.

|   | Standard Viscosity, Centipoise | Internal Friction | Resonance Amplitude, volts |
|---|---|---|---|
| 1 | .9 | $107\times10^{-5}$ | 9.1 |
| 2 | 9.3 | $116\times10^{-5}$ | 8.7 |
| 3 | 95 | $121\times10^{-5}$ | 7.4 |
| 4 | 940 | $197\times10^{-5}$ | 5.2 |
| 5 | 12,800 | $273\times10^{-5}$ | 3.3 |
| 6 | 97,300 | $441\times10^{-5}$ | 1.3 |

When log viscosity is plotted versus resonance amplitude, a curve results which is useful for measuring liquids of unknown viscosity.

FIGURE 6 shows recordings obtained for the series of materials tabulated below. Also listed below are the viscosities derived by comparing the resonance amplitude of these materials with those obtained for the standard-viscosity liquids.

| | Measured Viscosity, cp. | Internal Friction | Resonance Amplitude |
|---|---|---|---|
| 7. Air | <0.1 | 107×10⁻⁵ | 9.9 |
| 8. Acetone | <1.0 | 111×10⁻⁵ | 9.8 |
| 9. Machine oil | 14 | 145×10⁻⁵ | 8.3 |
| 10. SAE 10/30 oil | 35 | 160×10⁻⁵ | 8.1 |
| 11. Mineral oil | 46 | 161×10⁻⁵ | 7.9 |
| 12. SAE 30 oil | 135 | 193×10⁻⁵ | 7.2 |
| 13. Polybutyldiene polymer | 300,000 | 756×10⁻⁵ | 1.2 |
| 14. Olefin-modified polystyrene | 600,000 | 1,050×10⁻⁵ | 0.7 |

In FIGURE 5 the standard liquids have Newtonian viscosities. The non-Newtonian character of some of the material in the table listing materials 7 through 14 can be inferred from the frequency shifts shown in FIGURE 6. For example, note materials 12, 13, and 14. Also it may be noted that more sensitivity to viscosity differences was attained by expanding by a factor of three the amplitude scale for 13 and 14.

The use of a viscous fluid to fill the annulus of the torsion cylinder broadens the resonance peak and provides steadier amplitude readings for materials of low viscosity.

The apparent internal friction and viscosity as shown in the above tables were also measured by determining the number of vibrations required for the amplitude of vibration of an immersed tip to decay to one-tenth, one-fifth, and one-half full amplitude by means of an acoustic spectrometer. The relation applicable to these measurments is $$Q^{-1} = (2.3/n\pi) \log (A_0/A_n)$$

where $A_0$ is the initial amplitude of vibration and $A_n$ is the amplitude $n$ vibrations after the driving power is shut off.

Instead of the tip as shown in FIGURE 1, a clamp may be substituted so that an egg or other agricultural commodity such as a fruit may be inserted, and its internal consistency ascertained by the damping of the amplitude of vibration, or by the decay-of-vibration technique described previously.

Also by viewing the Lissajous pattern on an oscilloscope with energy input on the horizontal axis and detected signal on the vertical axis, the damping, viscosity, or consistency of a material can be measured by the frequency-phase method.

Configurations of tip other than spherical are also useful. When a conical tip was used in the measurement of the consistency of bread dough, it was found that the frequency of oscillation at resonance was lower than when a spherical tip was used. Also, the amplitude of oscillation had dropped markedly. The advantage of a conical tip in this instance is that it presents approximately the same surface area for shear contact with the dough for each measurement, so long as care is taken to prevent the dough from flowing back of the conical tip and coming in contact with the outer cylinder.

A sharp arrow-shaped tip was used to measure the consistency of meat. A flat headed tip was found useful for measuring the resiliency of human skin or flesh when the flat surface was held against the skin or flesh.

In addition to the several previously mentioned methods of varying the frequency of oscillation, i.e. by varying the size or position of inertial masses, oscillations at other frequencies was also achieved by exciting overtones of the elastic torsional sheath. For example, the aluminum tip of the model used in some measurements oscillated at a frequency of 550 cycles per second, but it also oscillated at about 1100 cycles per scond, the first overtone. Amplitudes of oscillation were dampened at both frequencies when the tip was immersed in a liquid.

The hollow elastic member 32 of FIGURE 1 was also oscillated in the fundamental and overtone modes of flexure and longitudinal compression. In order to excite the longitudinal modes the steel machine screw 37 in the top of the brass supporting shaft 28 was driven by the magnetic coil 27 which for this purpose was mounted on the vertical axis directly above the machine screw.

When there was no tip 24 two longitudinal frequencies were observed, 2275 and 2295 cycles per second. The higher frequency 2295 was believed to be caused by longitudinal vibrations in the shaft. When a hollow aluminum tip weighing 31.4 grams was attached the two frequencies in air became 1970 and 2011 cycles per second. The amplitudes were 5.0 and 7.6 volts respectively. In water the frequencies and amplitudes 1854 c.p.s. with 1.6 volts and 1880 c.p.s. with 1.9 volts were measured by the acoustic spectrometer. Overtones in air were observed at 3960 and 4960 c.p.s.

Among the several methods found for separating these two longitudinal frequencies in order that viscosity could be measured by reference to the amplitude depression it caused in oscillations of the hollow elastic member 32 was the following. When the center shaft has a Young's modulus E sufficiently larger than the E for the elastic member then the longitudinal shaft oscillations will be larger, other parameters being equal. The resonance frequency of the shaft would be $(E_1/E_2)^{1/2}$ times or about $(30/15)^{1/2}$ times the frequency of the elastic sheath and less likely to interfere when the shaft is steel and the sheath is brass.

Another method of isolating the desired fundamental oscillations of the sheath from oscillations in the shaft was discovered when a 140.5 gram tip was substituted for the 31.4 gram tip. The heavier tip constitutes a larger mass loading of the elastic sheath than it loads the inner shaft. When the substitution was made these results were obtained.

| | Frequency, c.p.s. | Amplitude, volts |
|---|---|---|
| Tip was immersed in— | | |
| Air | 1,552 | ¹ 4.3 |
| | 1,670 | |
| Acetone | 1,535 | 3.8 |
| Acetone=water | 1,529 | 2.9 |
| Water | 1,526 | 2.7 |
| SAE 30 oil | 1,540 | 2.4 |
| SAE 10W30 oil | 1,542 | 1.5 |

¹ Barely detected.

In the foregoing measurements the tip 24 was immersed to a constant depth in each liquid. The vessels containing the oil were larger than the vessels containing the water and acetone. Also the detector coil 29 was replaced by an ordinary phonograph piezoelectric pickup the needle of which was in contact with the inertia bar 22.

Not only was the viscometer responsive to viscosity as shown in the third column but also it responded to density as shown in column two. The acetone and SAE oils were both less dense than the water and both had higher frequencies. But since the viscosity of the acetone was less than water the amplitude was greater for it. However the more viscous motor oils had less amplitude than did the water.

Response by the longitudinal oscillatory viscometer was to both viscosity and to density. By means of the thermocouple 36 the viscometer responds to three very important factors. These are temperature, viscosity and density.

In its broader aspects the invention is not limited to the specific mechanisms shown and described, but departures may be made therefrom within the scope of the accompanying claim without departing from the principles of the invention and without sacrificing its chief advantages.

We claim:
1. A device for the measurement of viscosity of fluids and consistency of fluid-like materials comprising a hollow structural, elastic sheath, means to firmly attach one end of said sheath, the other end of said sheath free of constraining attachment, a rigid central shaft means supported by the free end of said sheath, an oscillatory drive means and a detecting means supported on said shaft means, the last three means being enclosed by the free end of said sheath, a rigid tip means supported by the free end of the sheath, at least part of the surface of said tip adapted to be in contact with the fluid or fluid-like material, whereby the oscillation amplitude of said tip is the same as the oscillation amplitude of the free end of the sheath and is also the same as the oscillation amplitude of the entire length of the central shaft.

References Cited

UNITED STATES PATENTS

| | | | |
|---|---|---|---|
| 2,819,610 | 1/1958 | White | 73—59 |
| 3,177,705 | 4/1965 | Banks | 73—59 XR |
| 3,181,348 | 5/1965 | Lewis | 73—59 XR |

FOREIGN PATENTS 910,881  11/1962  Great Britain.

OTHER REFERENCES

Ashwin et al.: Journal Sci. Inst., vol. 37, December 1960, pp. 480–485.

Spitznagel et al.: Rev. Sci. Inst., vol. 35, May 1964, pp. 582–586.

DAVID SCHONBERG, *Primary Examiner.*